United States Patent
Yasuda et al.

(10) Patent No.: US 12,433,922 B2
(45) Date of Patent: Oct. 7, 2025

(54) COMPOSITION FOR PROPHYLAXIS OF ENTERITIS IN AVIAN COMPRISING LACTOBACILLUS PLANTARUM STRAIN

(71) Applicant: Asahi Biocycle Co., Ltd., Tokyo (JP)

(72) Inventors: Gentaro Yasuda, Peachtree City, GA (US); Kotoyo Tanaka, Peachtree City, GA (US)

(73) Assignee: Asahi Biocycle Co., Ltd., Tokyo (JP)

( * ) Notice: Subject to any disclaimer, the term of this patent is extended or adjusted under 35 U.S.C. 154(b) by 0 days.

(21) Appl. No.: 17/949,757

(22) Filed: Sep. 21, 2022

(65) Prior Publication Data

US 2023/0398159 A1    Dec. 14, 2023

Related U.S. Application Data

(60) Provisional application No. 63/247,104, filed on Sep. 22, 2021.

(51) Int. Cl.
| | |
|---|---|
| A23K 10/18 | (2016.01) |
| A23K 50/75 | (2016.01) |
| A23L 33/135 | (2016.01) |
| A61K 35/747 | (2015.01) |
| A61P 1/12 | (2006.01) |
| A61P 31/14 | (2006.01) |

(52) U.S. Cl.
CPC ............ *A61K 35/747* (2013.01); *A23K 50/75* (2016.05); *A23L 33/135* (2016.08); *A61P 1/12* (2018.01); *A61P 31/14* (2018.01)

(58) Field of Classification Search
CPC ..... A61K 35/747; A23K 50/75; A23L 33/135; A61P 1/12; A61P 31/14
See application file for complete search history.

(56) References Cited

PUBLICATIONS

Maragkoudakis, Petros A., et al. "Lactic acid bacteria efficiently protect human and animal intestinal epithelial and immune cells from enteric virus infection." International journal of food microbiology 141 (2010): S91-S97 (Year: 2010).*
(Dhama, Kuldeep, et al. "Avian rotavirus enteritis-an updated review." Veterinary Quarterly 35.3 (2015): 142-158 (Year: 2015).*
Wu, Shannon Y., et al. "Overview of preclinical research." Translational Sports Medicine. Academic Press, 2023. 25-35. (Year: 2023).*
Grangette et al., "Enhanced antiinflammatory capacity of a Lactobacillus plantarum mutant synthesizing modified teichoic acids," PNAS, Jun. 19, 2005, 102(29):10321-10326.
Kawashima et al., "Double-Stranded RNA of Intestinal Commensal but Not Pathogenic Bacteria Triggers Production of Protective Interferon-B," Immunity, Jun. 27, 2013, 38:1187-1197.

(Continued)

*Primary Examiner* — Louise W Humphrey
*Assistant Examiner* — Mary A Crum
(74) *Attorney, Agent, or Firm* — Foley & Lardner LLP

(57) ABSTRACT

This application provides an agent or a composition comprising viable cells or dead cells of the *Lactobacillus plantarum* strain (International Accession No. NITE BP-03418) as an active ingredient for preventing enteritis or necrotic enteritis, for suppressing inflammation due to enteritis or necrotic enteritis, for suppressing decreased feed conversion efficiency or body weight loss, or for suppressing infection with enteric viruses in a bird (for example, a chicken), or a method that comprises feeding a bird (for example, a chicken) with the agent or the composition.

5 Claims, 4 Drawing Sheets

(56) References Cited

PUBLICATIONS

Lebeer et al., "Host interactions of probiotic bacterial surface molecules: comparison with comensals and pathogens," Nature Reviews, Microbiology, Mar. 2010, 8:171-184.
Moore, Robert J., "Necrotic enteritis predisposing factors in broiler chickens," Avian Pathology, 2016, 45(3):275-281.
Pantin-Jackwood et al., "Enteric Viruses Detected by Molecular Methods in Commercial Chicken and Turkey Flocks in the United States between 2005 and 2006," Avian Diseases, Jun. 2008, 52(2):235-244.

* cited by examiner

COMPOSITION FOR PROPHYLAXIS OF ENTERITIS IN AVIAN COMPRISING LACTOBACILLUS PLANTARUM STRAIN

BACKGROUND OF THE INVENTION

Field of the Invention

The present invention relates to an agent (a substance) or a composition for suppressing infection with enteric viruses (for example, Astro virus, Rota virus and Reo virus) in birds (for example, chickens), which comprises a *Lactobacillus plantarum* strain as an active ingredient.

The present invention also relates to an agent (or a substance or a composition for preventing or suppressing (or improving) enteritis such as enteritis caused by infection with enteric viruses, or suppressing decreased feed conversion efficiency or body weight loss due to enteritis.

The present invention further relates to a method for preventing or suppressing (or improving) infection with enteric viruses in birds, particularly enteritis such as necrotic enteritis caused by infection with enteric viruses, or a method for suppressing decreased feed conversion efficiency or body weight loss due to enteritis, which comprises feeding (for example, administration or intake) birds (for example, chickens) with the above agent (or substance) or the above composition.

Background Art

Infection with enteric viruses (for example, Astro virus, Rota virus, and Reo virus) significantly reduces chicken production results due to nephritis, RSS (Runting-stunting syndrome), diarrhea and the like that are directly induced by the infection (Pantin-jackwood et al., Avian Disease, 2008; 52:235-244). Moreover, immunodeficiency and decreased intestinal barrier function in a host resulting from viral infection facilitate the proliferation of bacteria such as *Clostridium perfringens* and *Escherichia coli* (*E. coli*) in the intestine, so as to further induce enteritis, such as necrotic enteritis (NE). Accordingly, viral infection is a factor directly and indirectly reducing chicken productivity. Particularly in current chicken production where no antibiotic is used, controlling *Clostridium perfringens* and *E. coli* is difficult. In order to remove the causes of enteritis, it is important to take a wide range of prophylactic measures for those including predisposing factors of enteritis such as viral infection.

In prophylaxis of viral infection, vaccines are effective; however, there is no vaccine effective against Astro virus and Rota virus. Further, RNA viruses, Astro, Reo and Rota viruses, frequently undergo mutations, and thus are difficult to be controlled by vaccines alone. Under such circumstances, prophylaxis of viral infection based on increases in chickens' own strength has been required (R. J. Moore, Avian Disease, 2016; 45:275-281).

Meanwhile, lactic acid bacteria have been industrially produced for a long time and are being revealed to have immunostimulatory action in mammals such as humans and chickens. However, these findings are limited to humans and mice, and there is no sufficient finding on chickens that are industrially important domestic animals.

Accordingly, an object of the present invention is to provide a method and a material (i.e., an agent, a composition or the like) for preventing enteritis such as enteritis caused by infection with enteric viruses, particularly necrotic enteritis from multiple sources, which is the biggest problem in chicken production, through actual screening for lactic acid bacterial strains having high ability to fight against infection with enteric viruses and evaluation of the prophylactic effect against infection with enteric viruses on chickens.

The present inventors have noted lactic acid bacteria having effects even in the form of dead cells, unlike conventional probiotics, because for the immunostimulatory action of lactic acid bacteria, outer surface molecules and nucleic acids of lactic acid bacteria can be recognized by the host, and this time screened, from among such lactic acid bacterial strains, for possible lactic acid bacterial strains that may have an anti-inflammatory effect in the intestines of chickens etc., and, directly prevent viral infection and suppress the onset of enteritis or necrotic enteritis (S. Lebeer et al., Nature Reviews, 2010; 8:171-184, C. Grangette et al., PNAS, 2005; 102:10321-10326; T. Kawashima et al., Immunity 2013; 38:1187-1197). Thus, the present inventors have discovered an excellent lactic acid bacterial strain capable of addressing the above problems and thus have completed the present invention.

SUMMARY OF THE INVENTION

Therefore, the present invention includes the following features.

[1] An agent or a composition for suppressing infection with an enteric virus in a bird, comprising viable cells or dead cells of a *Lactobacillus plantarum* strain (International Accession No. NITE BP-03418) as an active ingredient.

[2] An agent or a composition for preventing enteritis in a bird, comprising viable cells or dead cells of the *Lactobacillus plantarum* strain (International Accession No. NITE BP-03418) as an active ingredient.

[3] An agent or a composition for suppressing inflammation due to enteritis in a bird, comprising viable cells or dead cells of the *Lactobacillus plantarum* strain (International Accession No. NITE BP-03418) as an active ingredient.

[4] An agent or a composition for suppressing decreased feed conversion efficiency or body weight loss due to enteritis in a bird, comprising viable cells or dead cells of the *Lactobacillus plantarum* strain (International Accession No. NITE BP-03418) as an active ingredient.

[5] The agent or the composition according to any one of [2] to [4] above, wherein the above enteritis is caused by infection with an enteric virus.

[6] The agent or the composition according to any one of [2] to [5] above, wherein the above enteritis is necrotic enteritis.

[7] The agent or the composition according to any one of [1] to [6] above, which is a feed additive, a feed or water comprising viable cells or dead cells of the *Lactobacillus plantarum* strain (International Accession No. NITE BP-03418) as an active ingredient.

[8] The agent or the composition according to any one of [1] to [7] above, comprising the viable cells or the dead cells of the above *Lactobacillus plantarum* strain (International Accession No. NITE BP-03418) in an effective dose of at least about $1.5 \times 10^6$ cells/g or at least about $3.0 \times 10^6$ cells/g.

[9] The agent or the composition according to [8] above, wherein the above effective dose is from about $1.5 \times 10^6$ cells/mL to about $3.0 \times 10^6$ cells/mL or about $3.0 \times 10^6$ cells/mL or more.

[10] The agent or the composition according to any one of [1] to [9] above, further comprising bacteria of the genus *Bacillus*.

[11] The agent or the composition according to [10] above, wherein the above bacteria of the genus *Bacillus* are *Bacillus subtilis* or *Bacillus coagulans*.

[12] The agent or the composition according to [11] above, wherein the above *Bacillus subtilis* is *Bacillus subtilis* C-3102 (International Accession No. FERM BP-1096).

[13] The agent or the composition according to [11] above, wherein the above *Bacillus coagulans* is *Bacillus coagulans* CP3425 (International Accession No. NITE BP-01693).

[14] The agent or the composition according to any one of [1] to [13] above, wherein the above enteric virus is at least one virus selected from the group consisting of Astro virus, Rota virus and Reo virus.

[15] A method for suppressing infection with an enteric virus in a bird, comprising feeding a bird with the agent or the composition according to any one of [1] to [14] above.

[16] A method for preventing enteritis caused by infection with an enteric virus in a bird, comprising feeding a bird with the agent or the composition according to any one of [1] to [14] above.

[17] A method for suppressing inflammation due to enteritis caused by infection with an enteric virus in a bird, comprising feeding a bird with the agent or the composition according to any one of [1] to [14] above.

[18] A method for suppressing decreased feed conversion efficiency or bodyweight loss due to enteritis caused by infection with an enteric virus in a bird, comprising feeding a bird with the agent or the composition according to any one of [1] to [14] above.

[19] The agent or the composition according to any one of [1] to [14] above, wherein the above bird is a chicken.

[20] The method according to any one of [15] to [18] above, wherein the above bird is a chicken.

BRIEF DESCRIPTION OF THE DRAWINGS

FIG. 4A shows the cystic crypt count on Day 5 of infection and FIG. 4B shows the cystic crypt count on Day 12 of infection.

DETAILED DESCRIPTION

Figure 1:
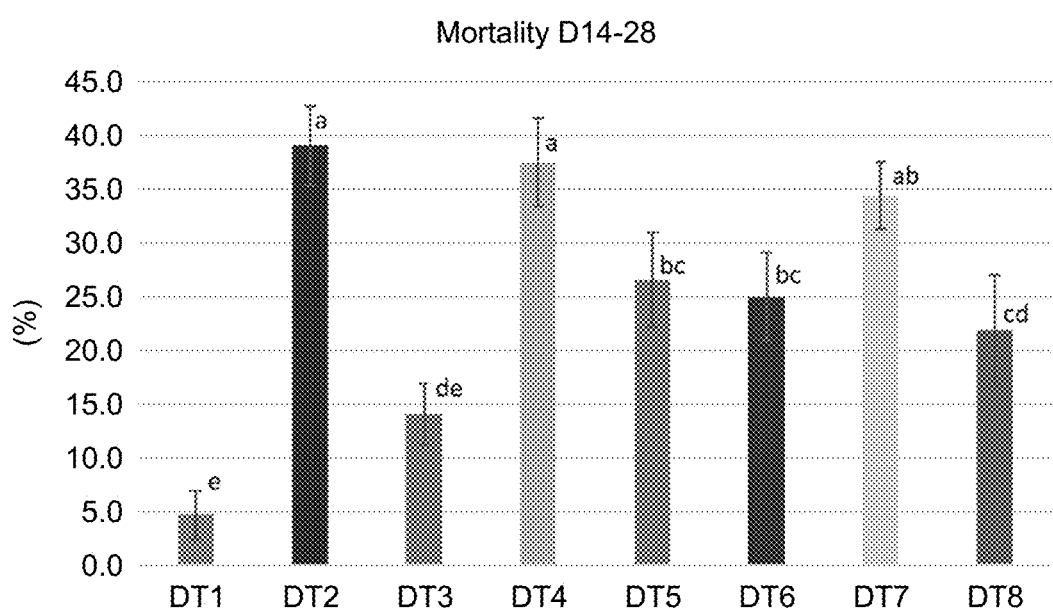
FIG. 1 shows decreases in mortality caused by necrotic enteritis on Day 14 to Day 28 (D14-28) after the start of treatment of feeding chickens with water supplemented with the lactic acid bacterial strain (*Lactobacillus plantarum* strain (International Accession No. NITE BP-03418)) of the present invention. T1 to T8 indicate different forms of treatment as defined in Example 1 (described later). Lowercase letters, a, e, ab, bc, cd, and de indicate the presence of significant differences at the significance level of 5%.

The present invention will be described in more detail.

1. Agent or Composition

The active ingredient of the agent or the composition of the present invention is the *Lactobacillus plantarum* strain (International Accession No. NITE BP-03418) (hereafter, may be referred to as "the lactic acid bacterial strain of the present invention".), which is a type of lactic acid bacteria. This strain was internationally deposited at an international depositary institution under the terms of the Budapest Treaty, the NITE (National Institute of Technology and Evaluation) Patent Microorganisms Depositary (#122, 2-5-8, Kazusakamatari, Kisarazu-shi, Chiba, 292-0818, Japan) on Feb. 19, 2021.

The term "agent" used herein refers to a substance, and in relation to the present invention, a substance containing the *Lactobacillus plantarum* strain that is an active ingredient, and examples thereof include a substance that prevents (or improves) enteritis (for example, necrotic enteritis) in birds (for example, chickens), a substance that suppresses inflammation due to enteritis (for example, necrotic enteritis), a substance that suppresses decreased feed conversion efficiency or body weight loss due to enteritis (for example, necrotic enteritis), and a substance that suppresses infection with enteric viruses.

Examples of the "agent" further include isolates and cultures of the lactic acid bacterial strain of the present invention (for example, culture solutions, concentrated culture solutions, and dried cells (e.g., lyophilized cells, vacuum-dried cells, and hot-air dried cells)), and a substance containing the lactic acid bacterial strain.

The term "composition" used herein comprises ingredients other the above active ingredient, and examples of such ingredients include diluents, excipients, other additives (for example, a binding agent, a disintegrator, a preservative, a coloring agent, and vitamins), and feed ingredients. Examples of the composition include feed additives, feeds, a composition for prophylaxis of enteritis (for example, necrotic enteritis), a composition for suppressing inflammation due to enteritis (for example, necrotic enteritis), a composition for suppressing decreased feed conversion efficiency or body weight loss, and a composition for suppressing infection with enteric viruses.

Cells of the lactic acid bacterial strain of the present invention may be either viable cells or dead cells.

The lactic acid bacterial strain can be proliferated by a method known for culturing *Lactobacillus plantarum*. A culture medium can contain a carbon source (e.g., sugar, molasses, peptone, and amino acid), a nitrogen source (e.g., a yeast extract, a meat extract, and amino acid), a lipid (e.g., fatty acid and surfactant), a trace element (e.g., zinc and manganese), and if necessary, vitamins etc. The pH of the medium is, for example, from 5.5 to 6.5. An example of the medium is deMan Rogosa Sharpe (MRS) medium. The culture temperature is generally from 34° C. to 37° C., and the time for culturing is, for example, from about 7 hours to about 20 hours or longer.

The lactic acid bacterial strain can be centrifuged after culture, for example, for solid-liquid separation, and then recovered as a solid. The solid may further be dried (for example, lyophilization).

Dead cells of the lactic acid bacterial strain of the present invention can be obtained by treating viable cells by heat treatment, sterilization, or the like. The term "dead cells" used herein may be any form of non-disrupted dead cells, partially disrupted dead cells, completely disrupted dead cells, or mixtures thereof. Cells can be disrupted by a mechanical method using a homogenizer, a blender, a mixer, glass spheres, ultrasonic wave or the like.

The term "bird(s)" used herein refers to Aves, and preferable examples thereof include domesticated birds such as a chicken, a turkey, a domestic duck, a wild duck, and a goose, and ornamental birds such as shoebill, flamingo, penguin, and parrot. A preferable example of the bird is a chicken.

Examples of the term "enteritis" used herein include enteritis caused by compromised immunity, such as necrotic enteritis, infectious enteritis (for example, viral enteritis), which results from intestines directly damaged by viruses or viral infection through infection with enteric viruses (for example, Astro virus, Rota virus, and Reo virus).

The term "necrotic enteritis" used herein refers to a disease characterized in that pseudomembranous lesions are observed on small intestinal mucosa, symptoms such as decreased appetite, depression, reddish-brown/blackish brown tarry stool are observed, and mortality is increased. As causes of the onset of this disease, a number of mixed infections of a prior infection with coccidian and the resulting proliferation of *Clostridium perfringens* have been reported (KM Biologics Co., Ltd., Avian Disease Information, Vol. 13, 2016).

Infectious enteritis is enteritis caused by pathogens such as viruses, bacteria, parasites and toxins, and is preferably viral enteritis.

The present invention provides the agents or the compositions described in the following (1) to (4).

(1) An agent or a composition for suppressing infection with enteric viruses in birds (for example, chickens), comprising viable cells or dead cells of the *Lactobacillus plantarum* strain (International Accession No. NITE BP-03418) as an active ingredient.

(2) An agent or a composition for preventing enteritis in birds (for example, chickens), comprising viable cells or dead cells of the *Lactobacillus plantarum* strain (International Accession No. NITE BP-03418) as an active ingredient.

(3) An agent or a composition for suppressing inflammation due to enteritis in birds (for example, chickens), comprising viable cells or dead cells of the *Lactobacillus plantarum* strain (International Accession No. NITE BP-03418) as an active ingredient.

(4) An agent or a composition for suppressing decreased feed conversion efficiency or body weight loss due to enteritis in birds (for example, chickens), comprising viable cells or dead cells of the *Lactobacillus plantarum* strain (International Accession No. NITE BP-03418) as an active ingredient.

The above compositions are feed additives or feeds for birds (for example, chickens) or water comprising viable cells or dead cells of the *Lactobacillus plantarum* strain (International Accession No. NITE BP-03418) as an active ingredient.

The dose of viable cells or dead cells of the *Lactobacillus plantarum* strain (International Accession No. NITE BP-03418) in each of the above agents or the above compositions is, unlimitedly, in the case they are administered via drinking water, for example, at least about $1.0 \times 10^6$ cells/mL or at least about $1.5 \times 10^6$ cells/mL, for example, from about $1.5 \times 10^6$ cells/mL to about $3.0 \times 10^6$ cells/mL, or about $3.0 \times 10^6$ cells/mL or more, about $1.0 \times 10^7$ cells/mL or more, or the like; and in the case they are compounded into solid feeds and administered via the solid feeds, for example, at least about $1.0 \times 10^6$ cells/g or at least about $1.5 \times 10^6$ cells/g, for example, from about $1.5 \times 10^6$ cells/g to about $3.0 \times 10^6$ cells/g, or about $3.0 \times 10^6$ cells/g or more, about $1.0 \times 10^7$ cells/g or more, or the like.

The agents or the compositions of the present invention can further contain a strain of the bacteria of the genus *Bacillus*. Through feeding a bird (for example, a chicken) with the above lactic acid bacterial strain in combination with a strain of the bacteria of the genus *Bacillus*, an effect of suppressing infection with enteric viruses, an effect of preventing enteritis caused by viral infection, an effect of suppressing inflammation due to enteritis, and an effect of suppressing decreased feed conversion efficiency or body weight loss due to enteritis can be enhanced.

The above "feed conversion ratio" refers to Feed Conversion Ratio (FCR). FCR used herein refers to feed supply weight (kg) per body weight (kg) of a bird (for example, a chicken) (i.e., weight of provided feed per weight of avian animal), which indicates that the lower the FCR, the higher the feed conversion efficiency.

Examples of strains of the bacteria of the genus *Bacillus* include *Bacillus subtilis* C-3102 (International Accession No. FERM BP-1096) and *Bacillus coagulans* CP3425 (International Accession No. NITE BP-01693).

The "*Bacillus subtilis* C-3102 strain" was deposited domestically on Dec. 25, 1985 at the International Patent Organism Depositary of the National Institute of Advanced Industrial Science and Technology (Tsukuba Center Central 6, 1-1-1 Higashi, Tsukuba-shi, Ibaraki, 305-8566, Japan) [at the time of deposition: 1-1-3, Higashi, Yatabe, Tsukuba-gun, Ibaraki, 305, Japan] under FERM P-8584, and was transferred in the same institution to the international deposition under the terms of the Budapest Treaty on Jun. 28, 1986, under accession No. FERM BP-1096 (at the time of transfer: FERM BP-1096). This deposited strain is currently stored at the NITE (National Institute of Technology and Evaluation)-IPOD (International Patent Organism Depositary) (#120, 2-5-8, Kazusakamatari, Kisarazu-shi, Chiba, 292-0818, Japan).

The "*Bacillus coagulans* CP3425 strain" was deposited at the NITE-IPOD (as described above) that is an international depository institution under the terms of the Budapest Treaty on Aug. 13, 2013 and assigned with International Accession No. NITE BP-01693.

Infection with enteric viruses is known to lower the productivity of birds (for example, chickens) (R. J. Moore, Avian Disease, 2016; 45:275-281), and as the causative viruses, Astro virus, Rota virus, Reo virus and the like are known. The agents or the compositions of the present invention were demonstrated to be also effective in prevention of enteritis, such as necrotic enteritis and suppression of inflammation, as well as suppression of infection with enteric viruses (Examples described later). Such effects make it possible to increase the productivity of birds (for example, chickens).

2. Methods

The present invention further provides the methods described in the following (5) to (8).

(5) A method for suppressing infection with enteric viruses in a bird (for example, a chicken), comprising feeding a bird (for example, a chicken) with the above agents or the above compositions.

(6) A method for preventing enteritis in a bird (for example, a chicken), comprising feeding a bird (for example, a chicken) with the above agents or the above compositions.

(7) A method for suppressing inflammation due to enteritis in a bird (for example, a chicken), comprising feeding a bird (for example, a chicken) with the above agents or the above compositions.

(8) A method for suppressing decreased feed conversion efficiency or body weight loss due to enteritis or necrotic enteritis in a bird (for example, a chicken), comprising feeding a bird (for example, a chicken) with the above agents or the above compositions.

The above agents or the above compositions, birds (for example, chickens), enteritis, such as necrotic enteritis, decreased feed conversion efficiency and the like are as described in the above section 1.

Examples of a method for feeding a bird (for example, a chicken) with the above agents or the above compositions can include a method that involves mixing the agents or the compositions with feeds (or foods) and a method that involves mixing the same with water. Any of these methods can exhibit similar effects (Examples described later).

The dose of the active ingredient, viable cells or dead cells of the *Lactobacillus plantarum* strain (International Accession No. NITE BP-03418) in the above agents or the above compositions is, unlimitedly, in the case they are administered via drinking water, for example, at least about $1.0 \times 10^6$ cells/mL or at least about $1.5 \times 10^6$ cells/mL, for example, from about $1.5 \times 10^6$ cells/mL to about $3.0 \times 10^6$ cells/mL, or about $3.0 \times 10^6$ cells/mL or more, about $1.0 \times 10^7$ cells/mL or more, or the like; and in the case they are compounded into solid feeds and administered via the solid feeds, for example, at least about $1.0 \times 10^6$ cells/g or at least about $1.5 \times 10^6$ cells/g, for example, from about $1.5 \times 10^6$ cells/g to about $3.0 \times 10^6$ cells/g, or about $3.0 \times 10^6$ cells/g or more, about $1.0 \times 10^7$ cells/g or more, or the like.

Further, the above *Lactobacillus plantarum* strain and bacteria of the genus *Bacillus* can also be used in combination. Examples of such strain of the bacteria of the genus *Bacillus* include, unlimitedly, *Bacillus subtilis* C-3102 (International Accession No. FERM BP-1096) and *Bacillus coagulans* CP3425 (International Accession No. NITE BP-01693). The dose of the strain of the bacteria of the genus *Bacillus* is, unlimitedly, for example, $1.0 \times 10^4$ cfu/g feed or more, $1.0 \times 10^5$ cfu/g feed or more, $3.0 \times 10^5$ cfu/g feed or more, and $1.0 \times 10^6$ cfu/g feed or more.

The above agents or compositions, and the above methods suppress infection with enteric viruses and enhance the intestinal barrier function, and thus with these two effects suppress enteritis, such as necrotic enteritis (NE), further prevent inflammation from becoming serious, as well as suppress body weight loss, thereby being useful for improving productivity of birds (for example, chickens).

Specifically, the lactic acid bacterial strain of the present invention suppresses infection with enteric viruses, so that direct diseases (for example, nephritis, Runting and Stunting syndrome (RSS) leading to significantly delayed growth of chickens, diarrhea, etc.) are suppressed and thus reduced productivity is suppressed (Examples 2 and 3 described later).

Moreover, infection with enteric viruses directly damages intestines, and indirectly causes compromised immunity and the like, thereby leading to the onset of enteritis. Accordingly, through suppression of viral infection, not only the above direct diseases, but also direct damage to intestines (for example, enteritis) can be suppressed (Example 2 described later).

Furthermore, viral infection weakens the immune system, and thus enteritis is induced by *Clostridium* and the like. Through enhancement of intestinal barrier function or immune barrier function, cyst formation is suppressed and thus enteritis is prevented from becoming serious, and further inflammation due to enteritis is suppressed, contributing to improvement in productivity (Examples 1 and 2 described later). The suppression of enteritis and inflammation is demonstrated by a decrease in Lesion score, and the effect of suppressing enteritis and inflammation is confirmed by maintaining the intestinal condition such as inflammation at a normal level. With these multiple effects, the lactic acid bacterial strain of the present invention suppresses reduced productivity caused by viruses.

Meanwhile, the *Bacillus subtilis* C-3102 strain can suppress necrotic enteritis through the control of *Clostridium perfringens* mediated by enteric bacteria, and thus the combined use of this strain and the lactic acid bacterial strain of the present invention can increase the effect of suppressing necrotic enteritis.

EXAMPLES

The present invention will be further described in detail with Examples as follows, but the scope of the present invention is not limited by these Examples.

Example 1

<Necrotic Enteritis (NE) Challenge Trial 1 (Water Administered)>

512 chickens (Cobb50, male) were housed in battery cages containing 8 chickens per cage (0.059 m² per chicken), and reared. Chickens were treated according to the following Treatment 1 to Treatment 8. The lactic acid bacterial strain of the present invention (dead cells of the *Lactobacillus plantarum* strain (International Accession No. NITE BP-03418)) was added to water, and *Bacillus subtilis* C-3102 (CALSPORIN™) was added to feed. Feed and water were provided ad libitum.

Treatment 1 (DT1): no NE challenge, no additive
Treatment 2 (DT2): NE challenged, no additive
Treatment 3 (DT3): NE challenged, with an antibiotic (StafacC) (22 g/US ton)
Treatment 4 (DT4): NE challenged, with the lactic acid bacterial strain of the present invention ($1.5 \times 10^6$ cells/mL water)
Treatment 5 (DT5): NE challenged, with the lactic acid bacterial strain of the present invention ($3.0 \times 10^6$ cells/mL water)
Treatment 6 (DT6): NE challenged, with CALSPORIN™ ($3.0 \times 10^5$ cfu/g feed)
Treatment 7 (DT7): NE challenged, T4+T6
Treatment 8 (DT8): NE challenged, T5+T6

Coccidial challenge ("NE Challenge") was performed from the Day of starting Treatment (DOT0) to Day 14 (DOT14), *Clostridium perfringens* (CP) challenge was performed from Day 19 (DOT19) to Day 21 (DOT21), and then NE Lesion score was measured on DOT28. Lesion score is to score the intestinal conditions, indicating the amount or the size of the lesion. Further, cage body weight, FCR (DOT0, DOT14, DOT21 and DOT28), and Mortality were measured.

The results of measuring FCR, Mortality and Lesion score are shown in Table 1.

TABLE 1

|     | FCR D14-21 | FCR D14-28 | Mortality D14-28 | NE Lesion score |
| --- | --- | --- | --- | --- |
| DT1 | $1.399^b$ | $1.371^c$ | $4.7^e$ | $0.000^e$ |
| DT2 | $2.848^a$ | $2.407^a$ | $39.1^a$ | $1.794^a$ |
| DT3 | $1.521^b$ | $1.559^{bc}$ | $14.1^{de}$ | $0.499^d$ |
| DT4 | $1.822^b$ | $1.720^b$ | $37.5^a$ | $0.958^b$ |
| DT5 | $1.770^b$ | $1.731^b$ | $26.6^{bc}$ | $0.875^{bc}$ |
| DT6 | $1.715^b$ | $1.754^b$ | $25.0^{bc}$ | $0.750^{bcd}$ |
| DT7 | $1.538^b$ | $1.561^{bc}$ | $34.4^{ab}$ | $0.625^{cd}$ |
| DT8 | $1.583^b$ | $1.667^{bc}$ | $21.0^{cd}$ | $0.667^{bcd}$ |

Lower-case letters, "$a$, $b$, $c$, $d$, $e$, $ab$, $bc$, $cd$, $de$, and bcd", indicate the presence of significant differences at the significance level of 5% between combinations of different alphabets.

The Mortality results in Table 1 are shown in FIG. 1.

When compared with DT2, feeding chickens with the lactic acid bacterial strain of the present invention ($3.0 \times 10^6$ cells/mL water) significantly decreased the chicken Mortality. Further in the case of DT8, a combination of DT5 and DT6, the Mortality was more improved than that of DT7, a combination of DT4 and DT6.

Therefore, feeding with the lactic acid bacterial strain of the present invention ($3.0 \times 10^6$ cells/mL water) resulted in decreased Mortality at the time of NE challenge, and, the combination of the lactic acid bacterial strain of the present invention ($3.0 \times 10^6$ cells/mL water) and CALSPORIN™ $3.0 \times 10^5$ cfu/g feed did not result in a significant difference, but successfully suppressed the Mortality at a level lower than that in the case of feeding with the strain alone or with CALSPORIN™ $3.0 \times 10^5$ cfu/g feed alone.

Figure 2:
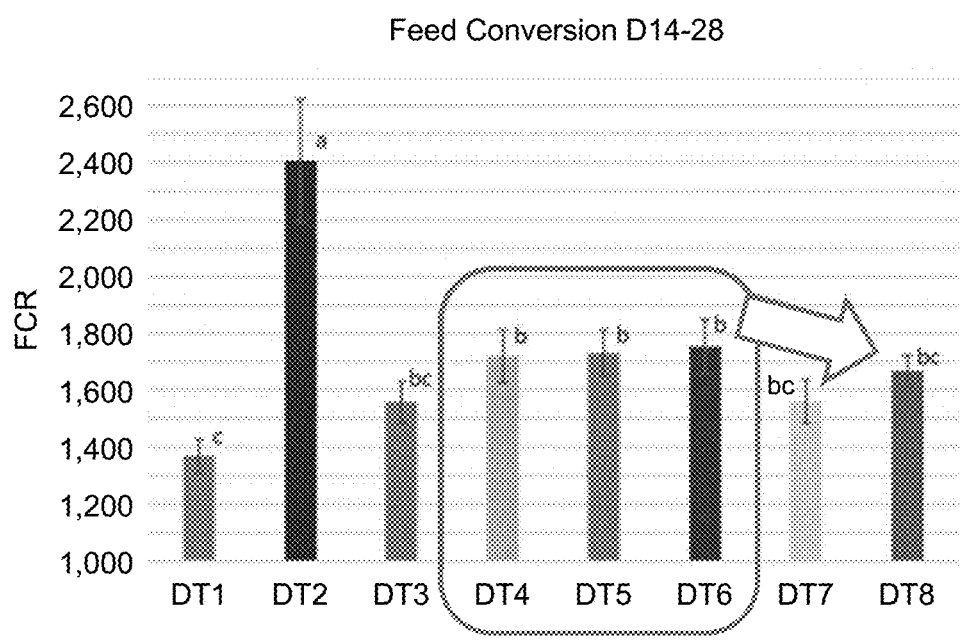
FIG. 2 shows improvement in feed conversion ratio (FCR) on Day 14 to Day 28 (D14-28) after the start of treatment of feeding chickens with water supplemented with the lactic acid bacterial strain (*Lactobacillus plantarum* strain (International Accession No. NITE BP-03418)) of the present invention. DT1 to DT8 indicate different forms of treatment as defined in Example 1 (described later). Lowercase letters, a, b, c, and be indicate the presence of significant differences at the significance level of 5%.

The results of Feed Conversion Ratio (FCR) in Table 1 are shown in FIG. 2.

When compared with DT2, feeding with the lactic acid bacterial strain of the present invention ($1.5 \times 10^6$ or more cells/mL water), or with CALSPORIN™ ($3.0 \times 10^5$ cfu/g feed) significantly suppressed decreases in feed conversion efficiency resulting from NE challenge.

It was revealed that feeding with the lactic acid bacterial strain of the present invention ($1.5 \times 10^6$ or more cells/mL water) (DT4, DT5) suppresses decreased feed conversion efficiency at the time of NE challenge, as well as the combination (DT7, DT8) of the lactic acid bacterial strain of the present invention and CALSPORIN™ did not result in a significant difference, but tended to improve FCR more than that of feeding with the strain alone or CALSPORIN™ alone.

Furthermore, the Lesion score resulting from NE challenge significantly decreased by feeding with the lactic acid bacterial strain of the present invention ($1.5 \times 10^6$ or more cells/mL water) or feeding with CALSPORIN™ ($3.0 \times 10^5$ cfu/g feed), when compared with DT2, and the Lesion score further decreased when compared with that of the combination (DT7) of DT4 and DT6 and that of the combination (DT8) of DT5 and DT6. These decreases indicate the suppression of intestinal inflammation and lesions.

<Necrotic Enteritis (NE) Challenge Trial 2 (Added to Feed)>

640 chickens (Cobb50, male) were housed in battery cages (battery cages) containing 8 chickens per cage (0.059 m² per chicken) and reared. Chickens were treated according to the following Treatment 1 to Treatment 5. The lactic acid bacterial strain of the present invention (dead cells of the *Lactobacillus plantarum* strain (International Accession No. NITE BP-03418)) was added to each feed. Feed and water were provided ad libitum.

Treatment 1 (FT1): no NE challenge, no additive
Treatment 2 (FT2): NE challenged, no additive
Treatment 3 (FT3): NE challenged, with an antibiotic (Stafac™) (22 g/US ton)
Treatment 4 (FT4): NE challenged, with the lactic acid bacterial strain of the present invention ($1.5 \times 10^6$ cells/g feed)
Treatment 5 (FT5): NE challenged, with the lactic acid bacterial strain of the present invention ($3.0 \times 10^6$ cells/g feed)

Coccidial challenge ("NE Challenge") was performed from the Day (DOT0) of starting Treatment to Day 14 (DOT14), *Clostridium perfringens* (CP) challenge was performed from Day 19 (DOT19) to Day 21 (DOT21), and then NE Lesion score was measured on DOT28. Lesion score is to score the intestinal conditions, indicating the amount or the size of the lesion. Further, cage body weight, FCR (DOT0, DOT14, DOT21 and DOT28), and Mortality were measured.

The results of measuring FCR, Mortality and Lesion score are shown in Table 2.

TABLE 2

|     | NE Lesion score |
| --- | --- |
| FT1 | $0.00^e$ |
| FT2 | $1.35^a$ |
| FT3 | $0.77^b$ |
| FT4 | $0.86^b$ |
| FT5 | $0.79^b$ |

$a$, $b$, and $c$ indicate the presence of significant differences at significance level of 5% between combinations of different alphabets.

Figure 3:
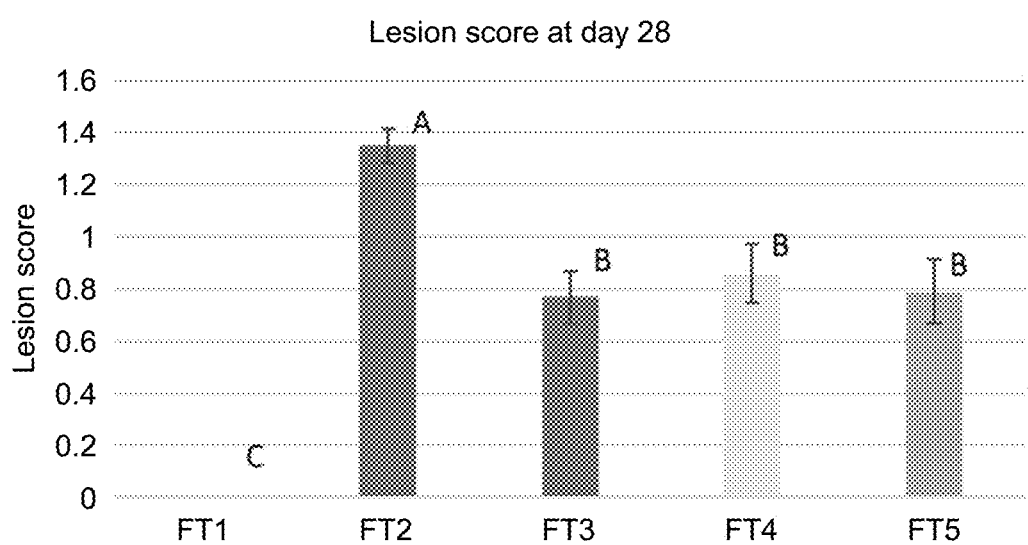
FIG. 3 shows decreases in intestinal inflammation (high lesion score) caused by necrotic enteritis on Day 28 after the start of treatment of feeding chickens with feeds supplemented with the lactic acid bacterial strain (*Lactobacillus plantarum* strain (International Accession No. NITE BP-03418)) of the present invention. FT1 to FT3, FT6 and FT7 indicate different forms of treatment as defined in Example 1 (described later). A, B, and C indicate the presence of significant differences at the significance level of 5%.

The Lesion score results in Table 2 are shown in FIG. 3.

As in the figure, it was found that feeding with the lactic acid bacterial strain of the present invention significantly suppresses intestinal inflammation and lesions induced by necrotic enteritis (NE).

In other words, feeding with the lactic acid bacterial strain of the present invention in a dose of $1.5 \times 10^6$ cells/g feed or more can reduce the Lesion score resulting from necrotic enteritis. The result is considered to indicate the Mode of action of the lactic acid bacterial strain of the present invention, such that lactic acid bacteria suppress inflammation and enhance the intestinal barrier function.

Example 2

<Chicken Virus Challenge Trial>

275 chickens (Ross 308, mixture of females and males) were housed in individual floor pens containing 50 chickens each per pen/treatment and reared. At the University of Georgia Poultry Diagnosis Research Center (U.S.A.), 1-day old (Day 1) chickens were challenged by inoculation with chicken Astro virus (CkAStV), maintained until 12 days old (Day 12), and then treated according to the following Treatments. At the ages in days indicated, individual body weight (1, 3, 5, 7 and 12 days old), Mortality (mortality; 5 and 12 days old), histopathology (duodenum; 5 and 12 days old), and virus count (5 and 12 days old) were measured.

Negative (negative control): no virus challenge+no additive
Positive (positive control): virus challenged+no additive The lactic acid bacterial strain of the present invention (dead cells of the *Lactobacillus plantarum* strain (International Accession No. NITE BP-03418)): virus challenged+the lactic acid bacterial strain of the present invention ($3.0 \times 10^6$ cells/g feed)

C-3102: *Bacillus subtilis* C-3102 (CALSPORIN™) ($3.0 \times 10^5$ cfu/g feed)

Cystic crypt counts (number of infected sites) in the duodena of 5 days old (Day 5) and 12 days old (Day 12) chickens were measured and compared.

Figure 4A:
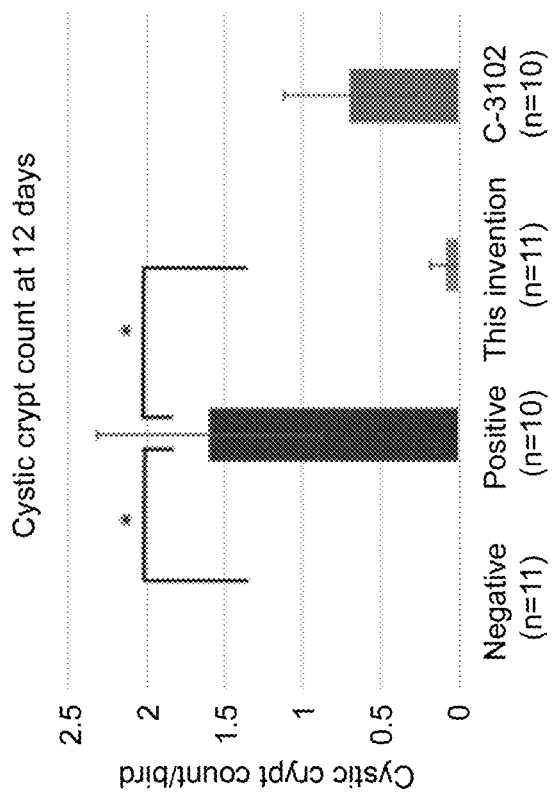
FIGS. 4A and 4B show decreases in high cystic crypt count (indicating the number of infected sites) in chicken duodena caused by viral infection (Chicken Astro Virus (CkAStV)) as a result of feeding chickens with the lactic acid bacterial strain (*Lactobacillus plantarum* strain (International Accession No. NITE BP-03418)) of the present invention; that is, decreases in infection rate.
Figure 4B:
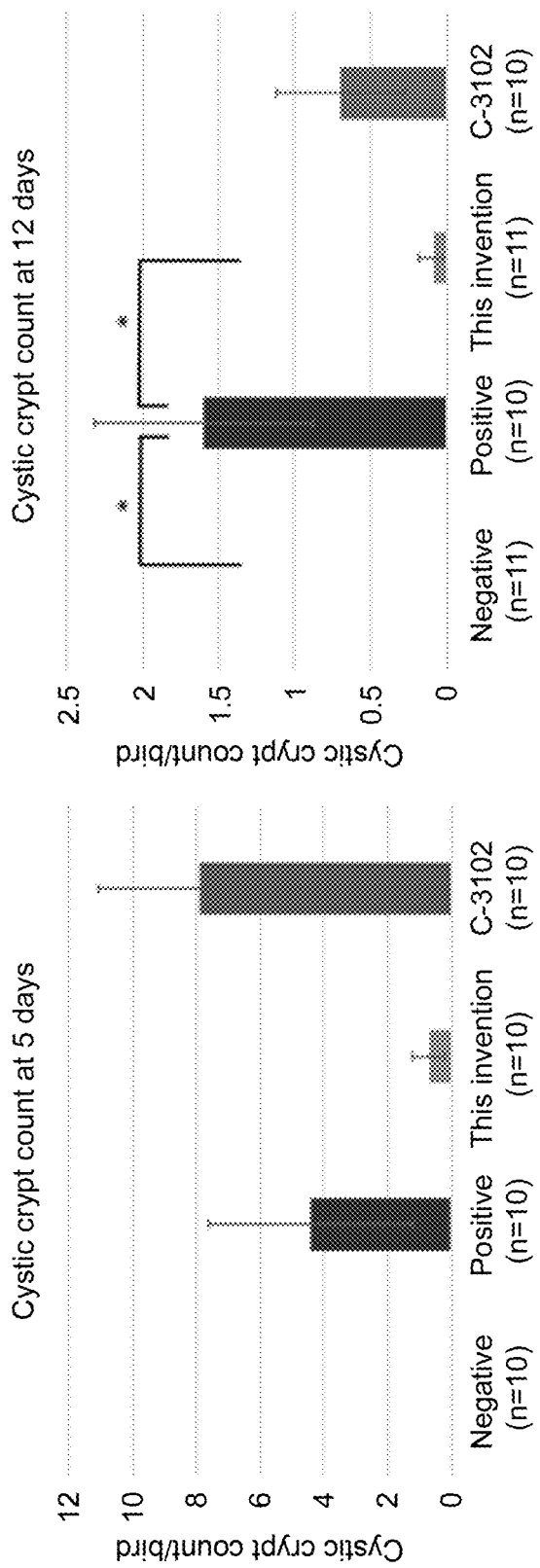

The results are shown in FIGS. 4A and 4B.

Cysts are formed in the intestine when viral infection occurs, the virus proliferates, and thus the infection further spreads. Hence, a lower cystic crypt count indicates that the viral infection is suppressed, and the intestinal barrier function or the immune barrier function is enhanced. When compared with the positive control, no significant difference was noted, but the cystic crypt count ($p=0.0524$) tended to decrease on Day 5, and on Day 12, feeding with the lactic acid bacterial strain of the present invention resulted in significantly decreased cystic crypt count. On the other hand, no significant decrease in cystic crypt count was observed among the group fed with C-3102. Moreover, feeding with the lactic acid bacterial strain of the present invention minimized variations in cystic crypt count among chickens, i.e., high "uniformity" was exhibited, revealing that such feeding can lead to stable and efficient chicken production.

As described above, feeding with the lactic acid bacterial strain of the present invention could protect chickens from viral infection, and minimize variations among chicken groups. Hence, the feeding can counteract the effects on production due to RSS or diarrhea directly caused by viruses and can further suppress NE indirectly induced by viral infection. Furthermore, maintaining the uniformity among chicken groups can realize efficient chicken production.

Example 3

<Mouse Virus (Rota Virus) Challenge Trial>

10 mice (5 days old) per treatment group were inoculated with Simian Rota virus on Trial Day 0 (Day 0). During Day 2 to Day 10, 5 lactic acid bacterial strains (all were dead cells) were each administered every day in a dose of 1 mg/day/head to each mouse. The Fecal score and body weight were measured every day during Day 0 to Day 10, and fecal virus counts were each measured on Day 5. Saline was administered to control mice.

The results of measuring fecal virus counts, fecal score and body weight are shown in

TABLE 3

|  | #77 | #35 | #125 | This invention | #137 |
|---|---|---|---|---|---|
| Virus count (DOT 5) | ◎ | X | ◎ | ◎ | ◎ |
| Fecal score | X | ○ | ◎ | ◎ | ◎ |
| Weight | ◎ | ◎ | ○ | ◎ | X |

This invention: *Lactobacillus plantarum* strain
77: *Leuconostoc citrium* strain
35: *Leuconostoc mesenteroides* strain
125: *Lactobacillus animalis* strain
137: *Lactobacillus plantarum* strain
◎: Good effect (significant difference)
○: Intermediate effect
X: Week effect With regard to parameters, fecal virus count, fecal score, host (mouse) body weight, only the lactic acid bacterial strain of the present invention exhibited significant improvement in all parameters. This revealed that the lactic acid bacterial strain of the present invention is a strain having excellent ability to fight against viral infection among the tested lactic acid bacterial strains.

The results obtained with the use of mice is also applicable to chickens, and this is also actually clear from the above results.

INDUSTRIAL APPLICABILITY

According to the present invention, both viral infection and excessive inflammatory reaction in a host can also be suppressed, and thus the present invention is useful in improvement of productivity of birds (for example, chickens).

What is claimed is:

1. A method for suppressing an enteric virus infection in a bird, comprising feeding a bird with an agent or a composition comprising dead cells of a *Lactobacillus plantarum* strain International Accession No. NITE BP-03418 as an active ingredient.

2. The method according to claim 1, wherein the method prevents enteritis in the bird.

3. The method according to claim 1, wherein the method suppresses inflammation due to enteritis in the bird.

4. The method according to claim 1, wherein the method suppresses decreased feed conversion efficiency or body weight loss due to enteritis caused by infection with the enteric virus in the bird.

5. The method according to claim 1, wherein the bird is a chicken.

* * * * *